Aug. 23, 1932.  E. G. GUNN  1,873,389
BRAKE
Filed March 1, 1929   2 Sheets-Sheet 2
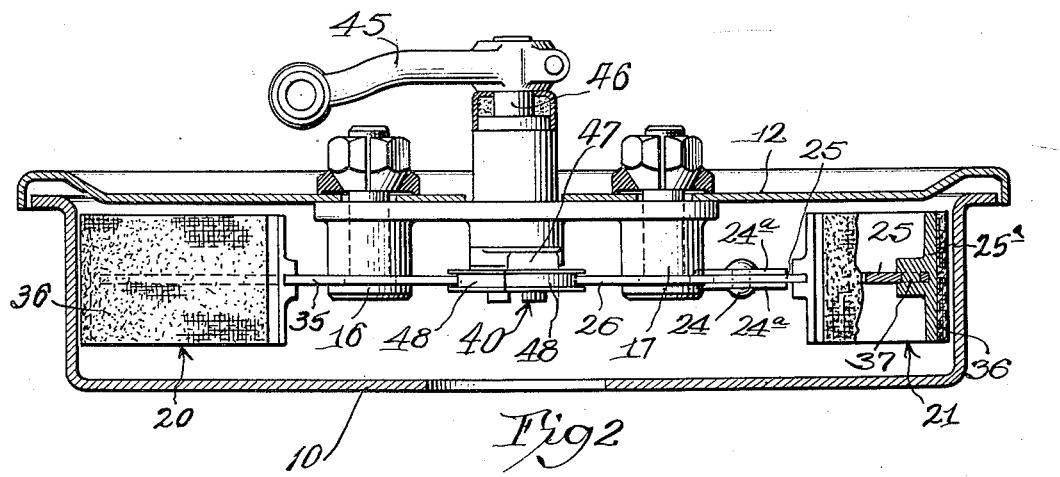
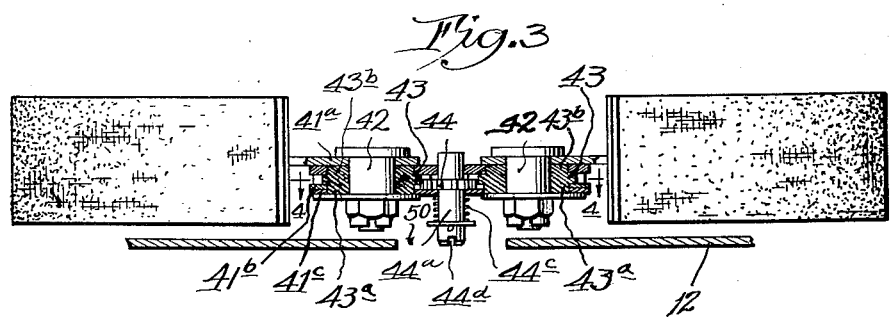
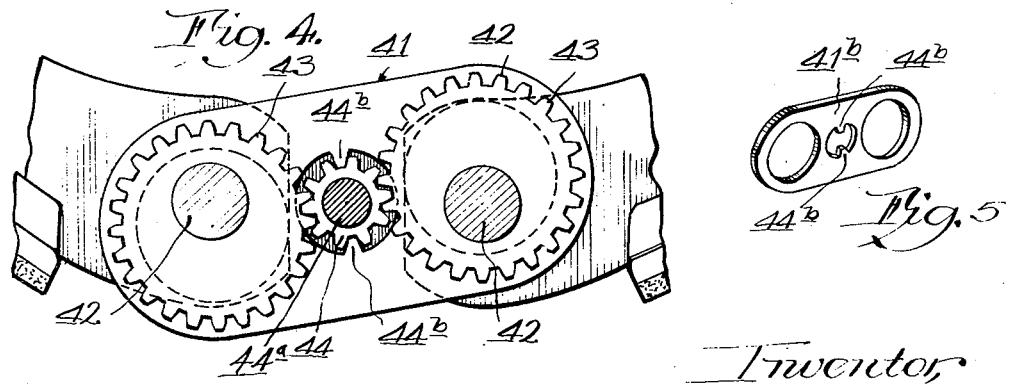

Patented Aug. 23, 1932

1,873,389

UNITED STATES PATENT OFFICE

EARL G. GUNN, OF RACINE, WISCONSIN, ASSIGNOR TO THE NASH MOTORS COMPANY, OF KENOSHA, WISCONSIN, A CORPORATION OF MARYLAND

BRAKE

Application filed March 1, 1929. Serial No. 343,585.

This invention relates to improvements in brake mechanism for motor vehicles, and more particularly to internal brake shoes having servo action.

The principal object of the invention is to provide a simple and more efficient construction for brakes of this character wherein the brake may be operated in either direction of rotation of the wheel.

A further object is to provide an improved and simplified construction whereby the brake shoes may automatically position themselves properly relative to the brake drum when in operation.

A further object is to provide an improved and simplified means for adjusting the brakes.

Other novel features of construction will also appear from time to time as the following description proceeds.

In carrying out my invention, I utilize certain novel features of construction heretofore broadly disclosed in my prior application bearing Serial No. 304,244 describing means for permitting limited radial movement of the shoe adjacent its point of anchorage, and application Serial No. 305,630 disclosing a similar feature as applied to servo brakes operative in either direction of rotation of the wheel, but with an improved and simplified construction of parts, as will hereinafter more fully appear.

The invention may best be understood by reference to the accompanying drawings, in which Figure 1 is a face view of a brake constructed in accordance with my invention, with parts broken away to show certain details of construction.

Figure 2 is a detail side view of the brake shown in Figure 1 with parts shown in section.

Figure 3 is a detail section taken on line 3—3 of Figure 1.

Figure 4 is an enlarged section taken on line 4—4 of Figure 3.

Figure 5 is a detail view of the locking link forming part of the adjusting mechanism shown in Figures 3 and 4.

Figure 1:
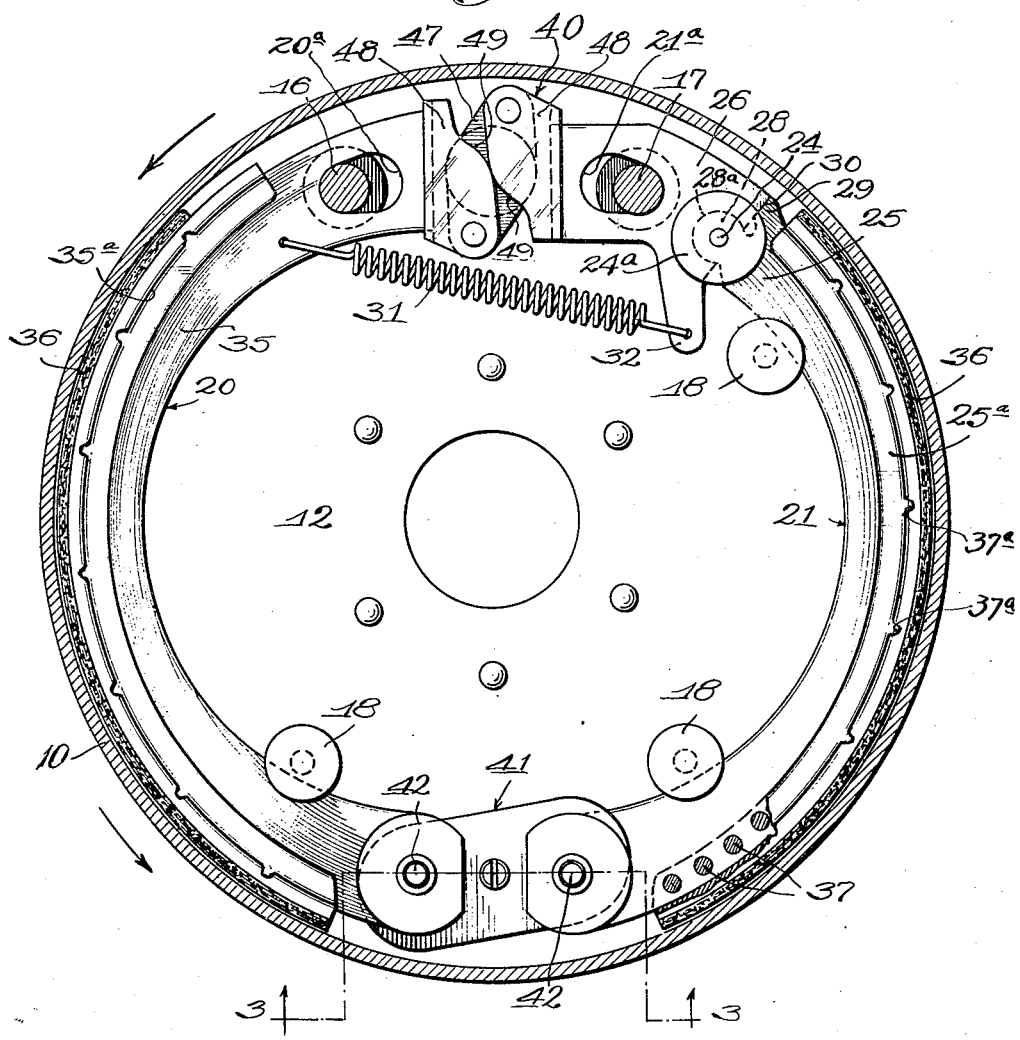

Referring now to details of the drawings, the brake drum 10 is carried by the wheel in the usual manner and the backing plate 12 is mounted on the wheel spindle (not shown) having the braking mechanism carried thereon.

The braking mechanism shown herein comprises two shoes 20 and 21 arranged in reversed position relative to each other so as to permit servo action in either direction of rotation of the wheel, as will presently appear.

A pair of brake anchor lugs is mounted in spaced relation on the backing plate 12, one lug 16 serving the shoe 20 and the lug 17 similarly serving the shoe 21. The shoes 20 and 21 are provided with slots 20a and 21a respectively, through which the anchor lugs 16 and 17 project, to permit limited circumferential movement of the shoes when operating in opposite directions.

In the preferred form shown, the slots 20a and 21a are each divergent toward their free ends, so as to afford relatively close fitting pivotal engagement with their respective anchor lugs when the shoes are in idle position, as seen in Fig. 1, but permitting relatively greater radial freedom of movement of the shoes when they are moved away from their anchored position.

The shoes 20 and 21 are generally similar in construction excepting that as herein disclosed, the shoe 21 is provided with an auxiliary pivotal connection adjacent its anchored end so as to permit the main part of the shoe carrying the brake lining 36 to position itself relative to the drum when the brake is applied. This feature is broadly disclosed in my copending application bearing Serial No. 304,244, but as herein carried out consists of a hinged connection between the main brake web 25 and a link 26 forming the anchored end of the shoe 21. In the form shown, the shoe web 25 has a circular portion 28 hinged in a recessed portion 28a of the link 26. A pin 24 extends through hinged portion 28 and secures a pair of retaining washers 24a, 24a on opposite sides of the shoe to hold the hinged parts from lateral displacement.

Means are provided for limiting the outward pivotal movement of the main brake web 25 relative to the link 26, herein such means consisting of a stop 29 on the web 25 abutting a shoulder 30 on the link 26 at the outside of the hinge connection.

In the embodiment illustrated herein, I provide only one shoe, namely, the shoe 21, with a hinged connection as above described, since the brake drum is normally arranged to rotate in a counter-clockwise direction as shown in Figure 1 and therefore most of the braking effort will be in such direction as to cause the anchor 17 to form the anchor for the servo system. Accordingly, the web 35 of the opposite shoe 20 has direct engagement with its respective anchor 16.

With the construction above described, the hinged connection referred to provides an outwardly yielding connection between the point of anchorage of the shoe 21 and the main arcuate braking surface thereof carrying the brake lining 36. Accordingly, the anchor 17 normally acts as a fixed hinged point for the shoe 21 when positioned in the smaller end of slot 21a so that when the brakes are applied with the drum rotating in its normal counter-clockwise direction, the hinged connection permits the shoe to automatically position itself concentrically relative to the brake drum.

When the drum is rotating in the reverse direction, the shoe 21 acts as the unanchored shoe of the system and its slotted end is shifted to the right so as to afford greater freedom of radial movement relative to the anchor 17.

The shoes 20 and 21 are maintained in contracted position when idle by spring 31 which tends to hold the shoes against stops 18, 18 carried by the backing plate and suitably disposed within the shoes. In the preferred form shown, said spring is connected to an ear 32 rigid with and depending from the link 26 of shoe 21, so as to tend to retract the latter shoe as a unit, with the stop 29 of the hinged joint in engagement with shoulder 30, as shown in Figure 1.

Referring now to a feature of construction which I find particularly desirable in brakes generally; it will be observed that the webs 25 and 35 of shoes 21 and 20 are both constructed of relatively flat and thin metal stock, such as steel stampings. Along the outer edge of these webs are secured relatively wide curved metal brake lining supports 25a and 35a, respectively. These supports are cast directly upon their webs, as, for instance by the die-casting process, for this purpose each of the webs being preferably provided with a plurality of apertures 37—37 along its outer margin through which the metal of the casting flows, as shown in Figures 1 and 2, so as to form a rigid connection between the parts. The brake lining supports 25a and 35a are preferably formed of aluminum alloy or similar relatively high heat conducting material so as to carry away the heat generated at the braking surface with greater rapidity than is possible with all-steel brake constructions.

In order to minimize the effects of warping in such castings, especially where the parts are die-cast to finished dimensions, I provide the inner surfaces of the lining supports with a plurality of circumferentially-spaced notches 37a, 37a, as shown.

Braking pressure is applied by an equalizer device indicated generally at 40, disposed between the anchored ends of the shoes 20 and 21. In the form shown in Figures 1 and 2, the equalizer device 40 is operated by lever 45 on the opposite side of backing plate 21 connected to a shaft 46 extending through said backing plate and having a cross arm 47 thereon. A pair of equalizer links 48—48 are pivotally mounted at opposite ends of the cross arm 47, said equalizer links slidably engaging the ends of the shoes 20 and 21, and being each provided with opposed curved surfaces 49—49 which normally engage each other on a line coincident with the axis of the operating shaft 46, as shown in Figure 1. The arrangement is such that by rotation of the operating shaft 46 and cross arm 47 in a clockwise direction, the equalizer links 48—48 may be spread more in one direction than the other, depending upon the direction of rotation of the drum, but with said equalizer links transmitting substantially equal pressure upon the ends of the brake shoes through the rolling action of the engaged surfaces 49—49, as described.

The lower or unanchored ends of the shoes 20 and 21 are connected for free pivotal movement relative to each other by means of a link 41 connected at opposite ends to pivot pins 42—42. In the form shown, the link 41 also includes an eccentric adjusting device capable of controlling the effective distance between the pivot pins 42—42. The link 41 is made up of three plates 41a, 41b and 41c having similar exterior shape and arranged in parallel relation with each other, as shown in Figure 3. The uppermost plate 41a is spaced from the two plates 41b and 41c by a pair of gears 43—43. Each of said gears is provided with hubs 43a and 43b which have bearing on one side in plate 41a and upon the other side in plates 41b and 41c. These gears, however, are eccentrically mounted with respect to pins 42—42 which pass therethrough, as is best shown in Figure 4 so that by rotation of the gears the effective length of the link 41 may be increased or decreased.

Means for rotating the gears consists of a pinion 44 on an endwise movable pin 44a, disposed between the gears 43—43 so that said pinion is in mesh therewith. The pinion 44 is of substantially the same thickness as the gears 43—43 but a portion of the plate 41b is cut away adjacent the pinion 44 so as to permit a portion of said pinion to fit therein and have locking engagement with one or more projections 44b. The pinion 44 is normally maintained in locking engagement with the projections 44b by means of a spring 44c. In order to unlock the pinion 44 and permit it to rotate the eccentric gears 43, the pin 44a is forced inwardly by a suitable tool, as for instance, a screw driver, which may be inserted through aperture 50 in the backing plate 12 (see Fig. 3) and applied in slot 44d, so as to move the pinion out of engagement with the locking projections 44b. When in this unlocked position, the eccentric gears 43—43 may be turned to any desired position of adjustment. Upon release of the pressure upon the pin 44d, the pinion 44 will automatically reassume its locked position by action of the spring 44c as soon as the pinion 44 is rotated to a position where the locking projections 44b register between adjacent teeth of said pinion.

Although I have illustrated and described the particular embodiment of my invention, it will be understood that I do not wish to be limited to the exact construction shown and described, but that various changes and modifications may be made without departing from the spirit and scope of my invention.

I claim as my invention:

1. In a servo brake, a drum, two connected shoes, anchoring pins each having slotted connection at adjacent ends with its respective shoe and adapted to take the braking reaction thereof when the drum is rotated in a direction to force said shoe toward said pin, said slotted connections affording relatively restricted pivotal movement of said shoes about their respective pins when in anchored position, but relatively greater freedom of radial movement when the drum is rotated in the opposite direction to force said shoe away from said pin, at least one of said shoes having a yielding connection adjacent its slotted end permitting limited radial movement thereof relative to the drum when in anchored position.

2. In a servo brake, a drum, two connected shoes, anchoring pins each having slotted connection at adjacent ends with its respective shoe and adapted to take the braking reaction thereof when the drum is rotated in a direction to force said shoe toward said pin, said slotted connections affording relatively restricted pivotal movement of said shoes about their respective pins when in anchored position, but relatively greater freedom of radial movement when the drum is rotated in the opposite direction to force said shoe away from said pin, at least one of said shoes having an auxiliary pivotal connection adjacent its slotted end permitting limited radial movement thereof relative to the drum when in anchored position.

3. In a servo brake, a drum, two connected shoes, anchoring pins each having slotted connection at adjacent ends with its respective shoe and adapted to take the braking reaction thereof when the drum is rotated in a direction to force said shoe toward said pin, said slotted connections affording relatively restricted pivotal movement of said shoes about their respective pins when in anchored position, but relatively greater freedom of radial movement when the drum is rotated in the opposite direction to force said shoe away from said pin, at least one of said shoes having an auxiliary connection adjacent its slotted end permitting limited radial movement thereof relative to the drum when in anchored position, and a tension spring connected between the slotted ends of said shoes and normally tending to cause said auxiliary connected shoe to pivot as a unit about its respective anchor pin.

4. In a servo brake, a drum, two connected shoes, anchoring pins each having slotted connection at adjacent ends with its respective shoe, and adapted to take the braking reaction thereof when the drum is rotated in a direction to force said shoe toward said pin, said slotted connections affording relatively restricted pivotal movement of said shoes about their respective pins when in anchored position, but relatively greater freedom of radial movement when the drum is rotated in the opposite direction to force said shoe away from said pin, at least one of said shoes having an auxiliary pivotal connection between its slotted end and its arcuate braking surface, and means limiting the outward pivotal movement of said braking surface relative to its slotted end.

5. In a servo brake, a drum, two connected shoes, anchoring pins each having slotted connection at adjacent ends with its respective shoe, and adapted to take the braking reaction thereof when the drum is rotated in a direction to force said shoe toward said pin, said slotted connections affording relatively restricted pivotal movement of said shoes about their respective pins when in anchored position, but relatively greater freedom of radial movement when the drum is rotated in the opposite direction to force said shoe away from said pin, at least one of said shoes comprising a link including its respective slotted end, and an arcuate braking member pivotally connected to said link, means limiting the outward pivotal movement of said braking member relative to said link, and a tension spring connected between the slotted end of the opposite shoe and said link at a point adjacent and within its point of pivotal connection to said braking member, and normally tending to retract said pivoted shoe as a unit about its respective anchor pin.

Signed at Racine this 22nd day of Feb., 1929.

EARL G. GUNN.